United States Patent Office.

ROBERT G. LOFTUS, OF CHELSEA, ASSIGNOR TO HIMSELF AND ALONZO FARRAR AND COMPANY, OF BOSTON, MASSACHUSETTS.

Letters Patent No. 81,654, dated September 1, 1868.

IMPROVED PROCESS OF TREATING PETROLEUM TO REMOVE THE MORE VOLATILE PORTIONS.

The Schedule referred to in these Letters Patent and making part of the same.

TO ALL PERSONS TO WHOM THESE PRESENTS MAY COME:

Be it known that I, ROBERT G. LOFTUS, of Chelsea, of the county of Suffolk, and State of Massachusetts, have invented or discovered a new and useful Method or Process of Treating Distilled Petroleum for the purpose of depriving it of its inflammable gas, whereby it is rendered dangerous or explosive; and I do hereby declare the same to be described as follows:

By law, petroleum, as made for sale in the market, must have a "test" of at least 110° Fahrenheit, that is to say, it must not be capable of igniting at a less temperature. What renders it dangerous or explosive is a very light liquid contained in it, which, at a low temperature, is easily changed into a gas readily inflammable. The purpose of my invention is the separation of this dangerous element from the rest of the petroleum, and this I accomplish by minutely dividing the petroleum into small streams, and allowing such to fall through the atmosphere, so as to cause the latter to act on the easily-vaporizable portions of the liquid, and dissipate the same.

The means I have adopted for carrying out my invention has been a tank or reservoir having a foraminous bottom, such tank being arranged some fifteen feet, more or less, above another tank, to receive the improved petroleum. Into the upper tank, by means of a pump or other suitable device, I discharge the petroleum to be treated. It will flow through the foraminious bottom of the tank and fall into the reservoir below. There should be a free circulation of air between and about the streams of falling liquid.

If necessary, the space between the two tanks may be encased, and air may be driven into and through it by a blower, and be discharged with the gas at or near the upper tank.

What I claim as my invention, is—

The separation of the petroleum into fine streams, and causing the same to pass through the atmosphere, so as to enable the latter to vaporize and dissipate the inflammable elements thereof.

R. G. LOFTUS.

Witnesses:
R. H. EDDY,
F. P. HALE, Jr.